US006801919B2

(12) United States Patent
Hunt et al.

(10) Patent No.: US 6,801,919 B2
(45) Date of Patent: Oct. 5, 2004

(54) OBJECT ORIENTED DATABASE INTERFACE ENCAPSULATION THAT ALLOWS FOR CHRONOLOGICALLY OVERLAPPING TRANSACTIONS IN A MULTI-THREADED ENVIRONMENT

(75) Inventors: Joseph R Hunt, Fort Collins, CO (US); Julio Cesar Garcia, Ft Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 256 days.

(21) Appl. No.: 09/916,539

(22) Filed: Jul. 27, 2001

(65) Prior Publication Data

US 2003/0023617 A1 Jan. 30, 2003

(51) Int. Cl.[7] .............................................. G06F 16/30
(52) U.S. Cl. ............................ 707/202; 707/2; 707/3; 707/8; 707/9; 707/10; 707/100; 705/39; 705/54
(58) Field of Search .................... 707/8, 102, 103 R, 707/202, 203, 1, 2, 3, 4, 9, 10, 100, 101, 104.1, 614; 709/226, 310, 202, 203, 204, 218, 219, 223, 227, 242, 246; 705/1, 3, 5, 7, 10, 14, 26, 39, 41, 51, 52, 53, 54, 64, 80, 223

(56) References Cited

U.S. PATENT DOCUMENTS

| 5,295,256 | A |   | 3/1994 | Bapat ......................... 395/500 |
| 5,504,885 | A |   | 4/1996 | Alashqur .................... 395/600 |
| 5,596,745 | A | * | 1/1997 | Lai et al. ................ 707/103 R |
| 5,659,725 | A |   | 8/1997 | Levy et al. .................. 395/600 |
| 5,809,505 | A | * | 9/1998 | Lo et al. ..................... 707/102 |
| 5,920,718 | A |   | 7/1999 | Uczekaj et al. |
| 5,943,497 | A |   | 8/1999 | Bohrer et al. |
| 6,023,578 | A |   | 2/2000 | Birsan et al. |
| 6,047,284 | A |   | 4/2000 | Owens et al. .................. 707/4 |
| 6,061,515 | A |   | 5/2000 | Chang et al. ............... 395/702 |
| 6,085,198 | A |   | 7/2000 | Skinner et al. |
| 6,289,390 | B1 | * | 9/2001 | Kavner ....................... 709/310 |

FOREIGN PATENT DOCUMENTS

| EP | 1061446 A2 | 12/2000 |
| GB | 2325539 B | 11/1998 |

\* cited by examiner

*Primary Examiner*—Shahid Alam
*Assistant Examiner*—Fred Ehichioya (57) ABSTRACT

A method for allowing chronologically overlapping database transactions in a multi-threaded environment without the need for explicit thread synchronization for database access. Literal database connections are managed on a per thread basis, thus allowing different chronologically overlapping transactions in different threads. Four basic objects are used to accomplish the chronologically overlapping transactions in a multi-threaded environment. The environment object is a static object that creates and maintains a pointer to the database application environment handle in addition to performing basic error recovery and initialization functionality. The database object encapsulates a logical database connection. The database connection object contains the functions that can be performed on a database connection, such as transaction management and query creation. The database statement object encapsulates a query that can be made to the database. This database statement object allows parameters to be attached to the query, and result objects to be returned.

21 Claims, 10 Drawing Sheets

OBJECT ORIENTED DATABASE INTERFACE ENCAPSULATION THAT ALLOWS FOR CHRONOLOGICALLY OVERLAPPING TRANSACTIONS IN A MULTI-THREADED ENVIRONMENT

FIELD OF THE INVENTION

The present invention relates generally to object oriented development of database applications and more specifically to the use of chronologically overlapping transactions in a multi-threaded application.

BACKGROUND OF THE INVENTION

Figure 1A:
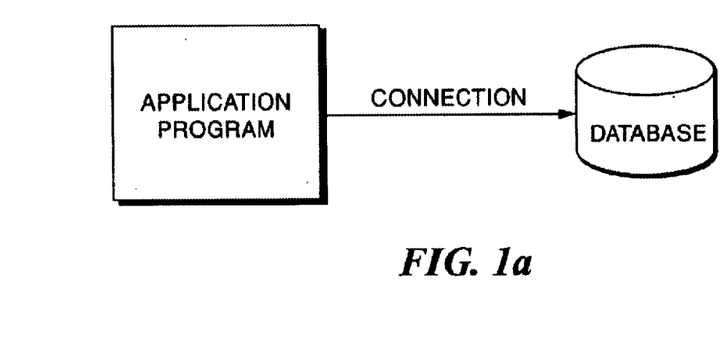
FIG. 1a shows a single connection between an application program and a database, according to the prior art.
Figure 1B:
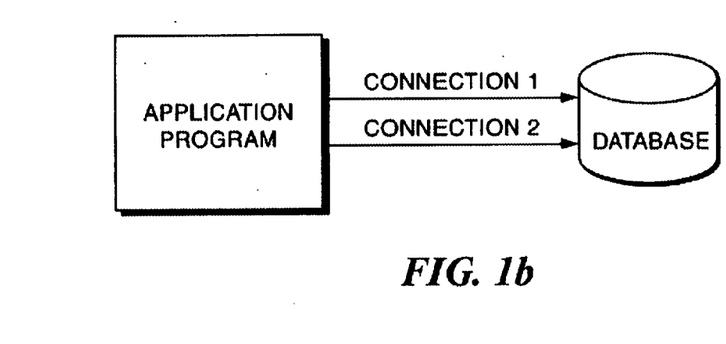
FIG. 1b shows the use of two connections to establish nested transactions, according to the prior art.

Multi-threaded Open DataBase Connectivity (ODBC) database access has historically been accomplished through a number of complicated mechanisms. Full suites of database toolsets are available that provide Object Oriented (OO) wrappers and hundreds of objects to perform database queries. These toolsets are complicated and feature ridden. They also do not pool connections to allow for parallel transactions on separate threads. The ODBC Application Program Interface (API) can be used to write multithreaded applications, but it would require a significant amount of effort to maintain thread safety and transaction integrity. Further, as illustrated in FIGS. 1a and 1b, the ODBC API does not allow nested transactions on a single connection. Thus, using the current ODBC API, a transaction start and end must not encompass another transaction start and end. Multiple connections must be used to achieve concurrency.

Figure 2:
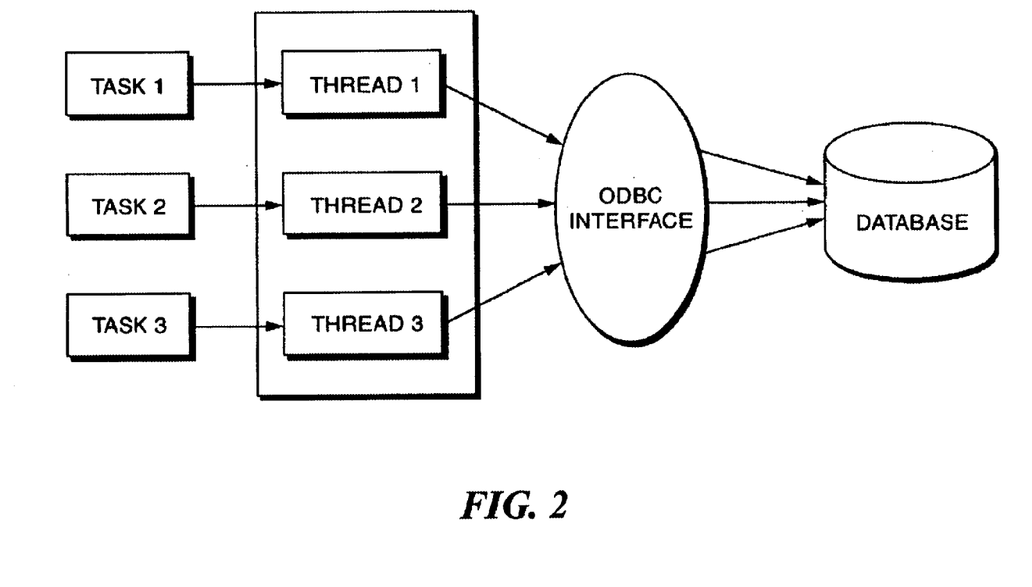
FIG. 2 shows an example of the problems associated with using multiple threads to access a single database, according to the prior art.

Referring now to FIG. 2, an example of the difficulty inherent in synchronizing thread access to the database is shown. In this example, three separate tasks within an application require database access. In a multi-threaded environment, this is accomplished through the use of three threads in this example, each of which accesses the database independently using three separate connections to the database. Access to the database is managed by the ODBC layer. The ODBC layer interacts directly with the database management system to setup and destroy this connection. This interaction is expensive, both in terms of memory and time. The problems illustrated in FIG. 2 are typical, and could be mitigated if a more efficient connection management strategy were used. One important note is that not all the components of a given task require database access. And, some tasks require no database connection. Thus, improving the thread management strategy between the threads and the database should directly improve the development time associated with this application. In an application in which threads are employed, the complexity of the application is greatly influenced by the manner in which the threads are created and managed. Lack of a consistent thread management strategy increases the complexity of thread programming and also increases the likelihood of encountering defects related to thread complexity.

BRIEF SUMMARY OF THE INVENTION

According to a method of the present, a technique for encapsulating interactions between a database application and a database that allows chronologically overlapping transactions using a single database connection in a threaded environment is disclosed. After launching the database application, one or more entities are created for the purpose of communication between the database application and the database. These entities are operable for opening one or more logical connections to the database. After the establishment of a database connection, a request for database access causes the entities to create, send and receive one or more database queries between the database application and the database.

A specialized entity of the created and initialized entities employs a mapping of one or more database application tasks contained in one or more corresponding application threads to one literal connection to the database. The number of literal connections to the database can be less than the number of tasks contained in one or more corresponding application threads in the database application. These literal connections may be pooled.

In accordance with a preferred embodiment of the method, created and initialized entities are used concurrently so that one or more database transactions may be transmitted in a chronologically overlapping fashion between the database application and the database. Object-oriented methodology, comprising environment objects, database object, database connection objects, and database query objects, is disclosed. The environment objects are used to create new database objects, and otherwise monitor the object oriented interface between the database application and the database. The database objects and database connection objects are used to facilitate interactions between the database application and the database, including assigning the literal connections to the database. The database query object sends queries to the database and receives the results of these queries.

According to the structure of an embodiment of the present invention, an encapsulation of one or more interactions between a database application and a database that allows chronologically overlapping transactions using a single database connection in a threaded environment. The structure contains a connection management layer residing below an application layer and above a database interface layer, where the database interface layer is coupled to the database. One or more threads connect the application layer to the connection management layer, where each thread contains one or more tasks. The connection management layer handles one or more connections to the database interface layer.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

According to the method of the present invention, a connection management strategy that encapsulates the link between the threads from the application layer and the literal connections to the database is used. In this strategy, a connection management layer is placed between the application layer and the database interface layer. The application layer handles the creation, initialization, use, and deletion of application specific tasks that do not involve database interaction. Interactions with the database are handled using the connection management layer and the database interface layer. Inputs to the connection management layer are threads that carry database specific tasks and results. The strategy used by the connection management layer is to encapsulate the literal connections to the database so that a minimum number of connections may be used. Using this strategy, only those literal connections within the database interface layer that are needed are created and used, significantly reducing the development time and programming complexity associated with creating multi-threaded database applications.

In order to encapsulate the database connections, four basic object types are used: an environment object, a database object, a database connection object, and a database query object. The environment object is a static object that exists once per application, and is a factory for database connection objects. The database object encapsulates a user database session, and appears as one connection, although it may span several physical connections. The database object also acts as a factory for the database connection object and database query objects. The database connection object is hidden behind the database object and provides a literal connection to a database, as well as a context for any transactions that occur. Finally, the database query object allows database statements to be issued to the database.

The connection management layer can be used in a single- or multi-threaded environment with or without transactions. If a single-threaded application is used, then only one database connection object is used, and all database accesses occur using this object. For both single- and multi-threaded applications, one database object exists per logical connection to a database. In a multi-threaded application, each database access on a new thread creates a new database connection object. The database object is responsible for the mapping of application layer threads to database connection objects. The database connection objects interact with the entities in the database interface layer that contain literal connections to the database. The entities in the database interface layer are maintained in memory for the duration of the application layer interaction with the database. This allows the database connection objects to use one of these existing entities when database interaction is desired. In effect, these database interface entities are stored as an aggregate resource, and any of these entities may be used to satisfy a database interaction as needed. The application layer creates this aggregation upon application start-up and initialization.

This aggregation, or pooling of database interface entities, allows the application to perform chronologically overlapping transactions. That is, a first transaction can be started using a proxy connection between a database connection object and a literal connection established by a database interface entity. While the first transaction is being processed, a second transaction in a separate thread uses a second database connection object to assign a second literal connection established by a second database interface entity. In this manner, overlapping chronological transactions can occur. The first transaction exists in one thread using an encapsulated literal connection, while the second transaction exists in another thread using another encapsulated literal connection. Of course, the present invention is applicable to any number of transactions.

Figure 3:
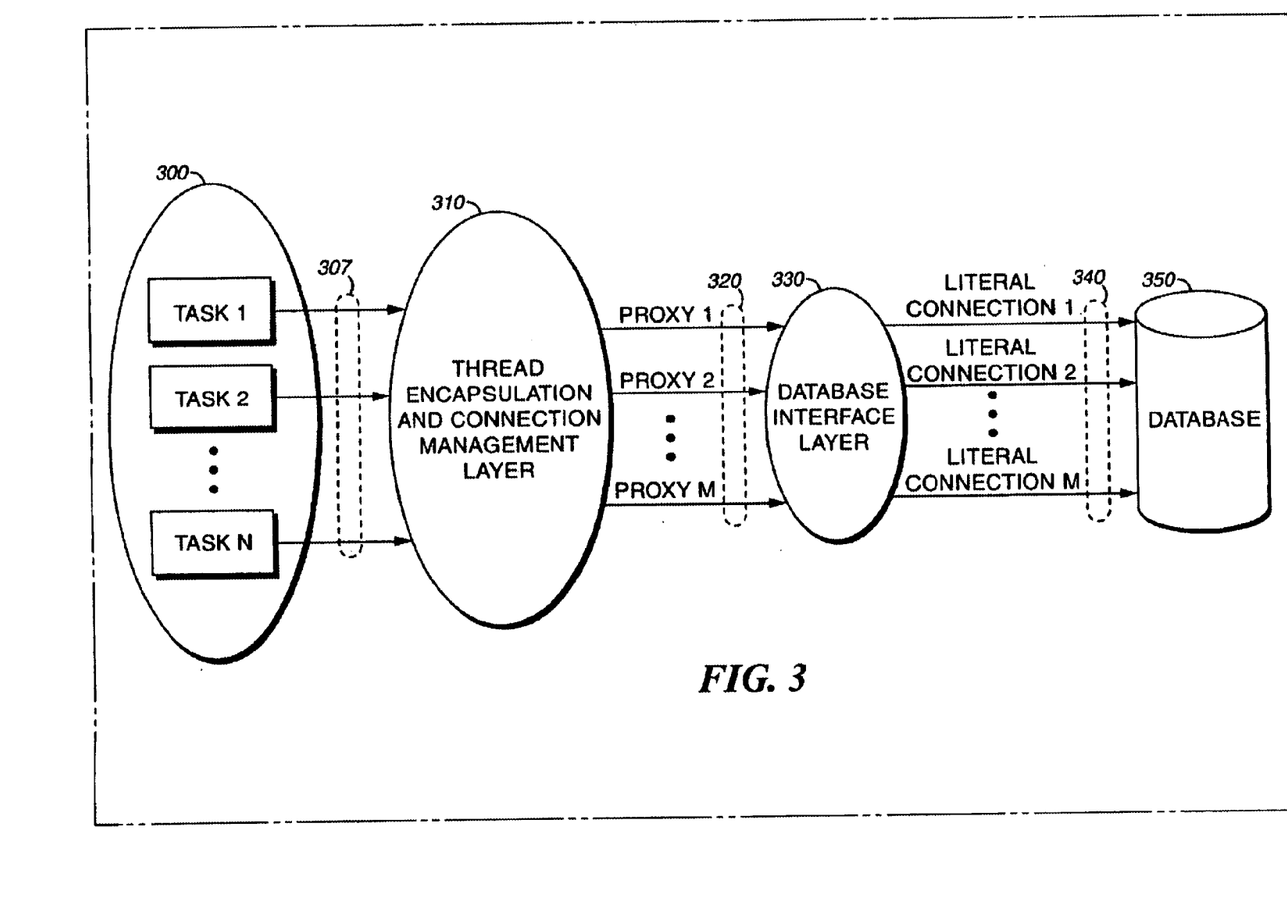
FIG. 3 shows a simplified representation of the connection management strategy, according to the present invention.

The present invention discloses a method for encapsulating a plethora of interactions between a database application and a database so that chronologically overlapping transactions are possible using a single database connection in a threaded environment. Referring now to FIG. 3, an application 300 has tasks, task1, task2, . . . task N 305, which send and receive information from a database 350, wherein the information passes first through a connection management layer 310 and then through a database interface layer 330. The tasks 305, running on threads 307, communicate with the connection management layer 310. The connection management layer 310 has proxy connections 320 with the database interface layer 330. The database interface layer 330 maps these proxy connections 320 to literal connections 340 to the database 350.

Figure 4:
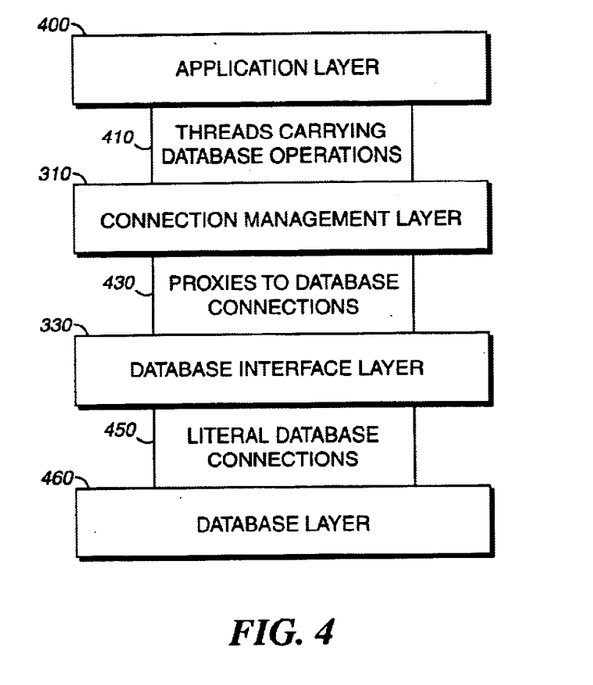
FIG. 4 shows a detailed description of the object interactions between the database layer, the connection management layer, and the tasks within the application program, according to the present invention.

Referring now to FIG. 4, a perspective of the invention using layers is shown. An application layer 400, which contains tasks 300 executed on threads 307, requiring database access is connected to a connection management layer 310 via database object 510. The connection management layer 310 maps database interactions to database connection object 520 in the database interface layer 330 corresponding to the executing thread. The database interface layer 330 exchanges database query statements and results using literal connections 340 with database layer 460. The database layer 460 communicates with database 350.

Figure 5:
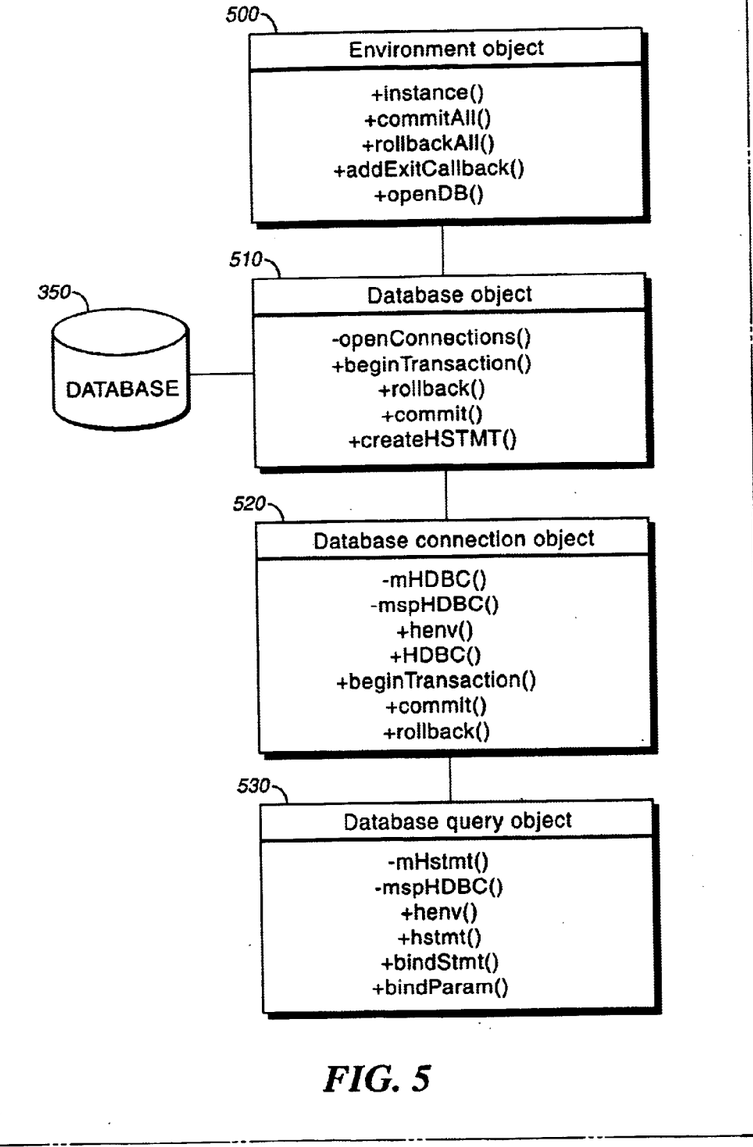
FIG. 5 shows how the connection management strategy fits into the overall application architecture, according to the present invention.

Referring now to FIG. 5, an object-oriented embodiment of connection management layer 310, in accordance with the present invention, is shown. The connection management layer 310 contains four database objects: an environment object 500, a database object 510, a database connection object 520, and a database query object 530. The environment object 500 contains methods for handling interactions between the database 350 and the operating system, as well as methods for handling errors in communicating with the database 350, such as committing all transactions, rolling back all transactions, adding an error handler, and opening a connection to the database 350. The database object 510 handles establishing and maintaining connections to the database 350, including opening a database connection, beginning a transaction, rolling back a transaction, committing a transaction, and creating a database statement. The database connection object 520 is responsible for handling an individual connection with the database 350, including beginning a transaction, committing a transaction, rolling back a transaction, and obtaining pointers to the environment object, the database connection object, and the database object 510. The database connection object 520 also contains the means to communicate database query information with the database query object 530. The database query object 530 creates and assembles database query statements for transmission to the database 350, including binding methods, handles to the environment object 500 and the database connection object 520.

Figure 6:
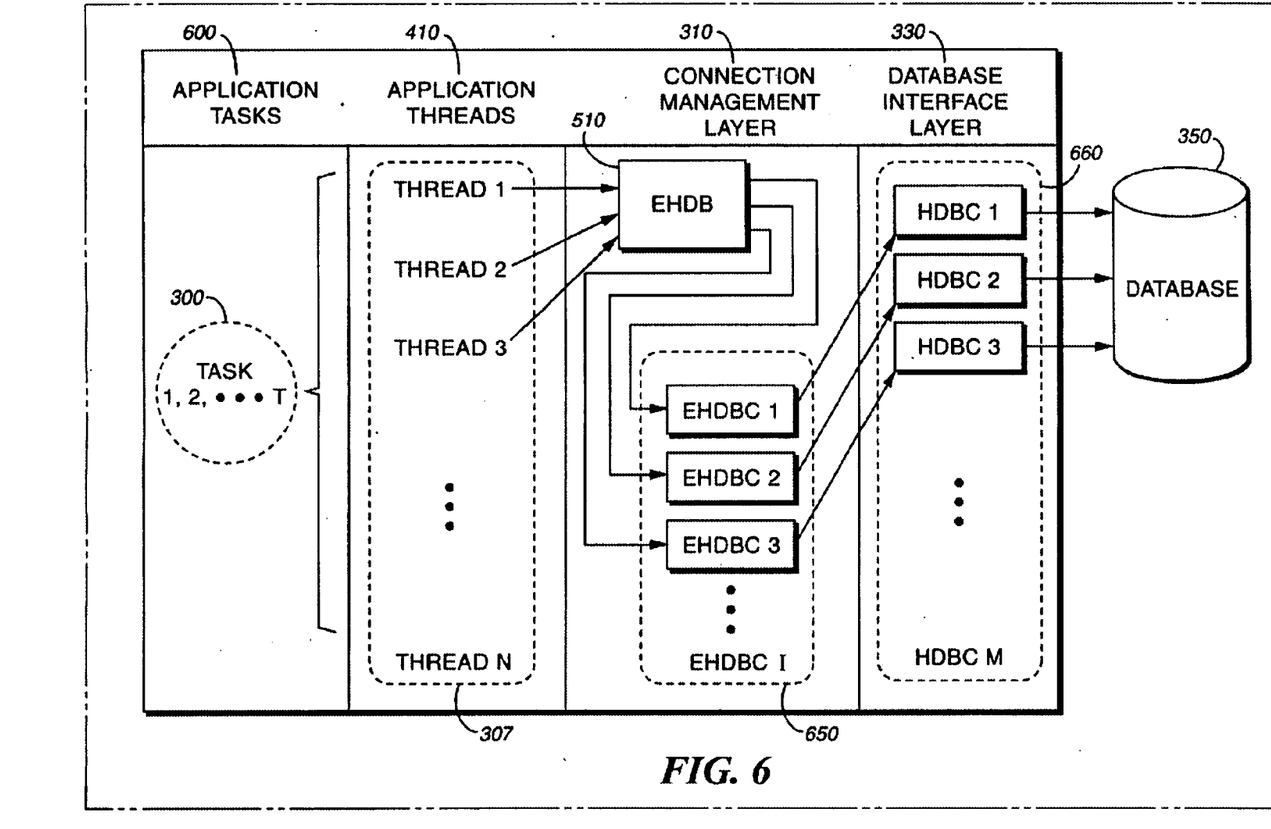
FIG. 6 shows the relationship between the objects used in the connection management strategy, according to the present invention.

Referring now to FIG. 6, the object interactions between application tasks 600 coupled to application threads 610, objects contained in connection management layer 310, and objects in database interface layer 330 are shown. The database interface layer 330 is connected to database 350. The application tasks 600 interact through the database object EHDB 510 to send and receive a plurality of information to and from database 350. The application contains application tasks task 1, task 2, . . . task T 300; only some application tasks may actually use EHDB 510. Referring again to FIG. 6, the tasks 600 contain that subset of the plethora of application tasks that are coupled to a thread and of which some may require database access. Each of the threads 307 have access to a single database object EHDB 510 that couples each of the threads 307 to a single connection object of connection objects EHDBC 1, EHDBC 2, . . . EHDBC I 650. The database object EHDB 510 exists in a program memory location for the duration of the application. The connection objects EHDBC 1, EHDBC 2, . . . EHDBC I 650 are organized so that any one of the plurality of connection objects EHDBC 1, EHDBC 2, . . . EHDBC I 650 may be coupled to any one of the one or more tasks 300. The connection objects EHDBC 1, EHDBC 2, . . . EHDBC I 650 are coupled to a single connection interface object of the connection interface objects HDBC 1, HDBC 2, . . . HDBC M 660 in the database interface layer 330. Each of the plurality of connection interface objects HDBC 1, HDBC 2, . . . HDBC M 660 are coupled to the database 350 and facilitate the exchange of information between the database 350 and the application program.

Figure 7:
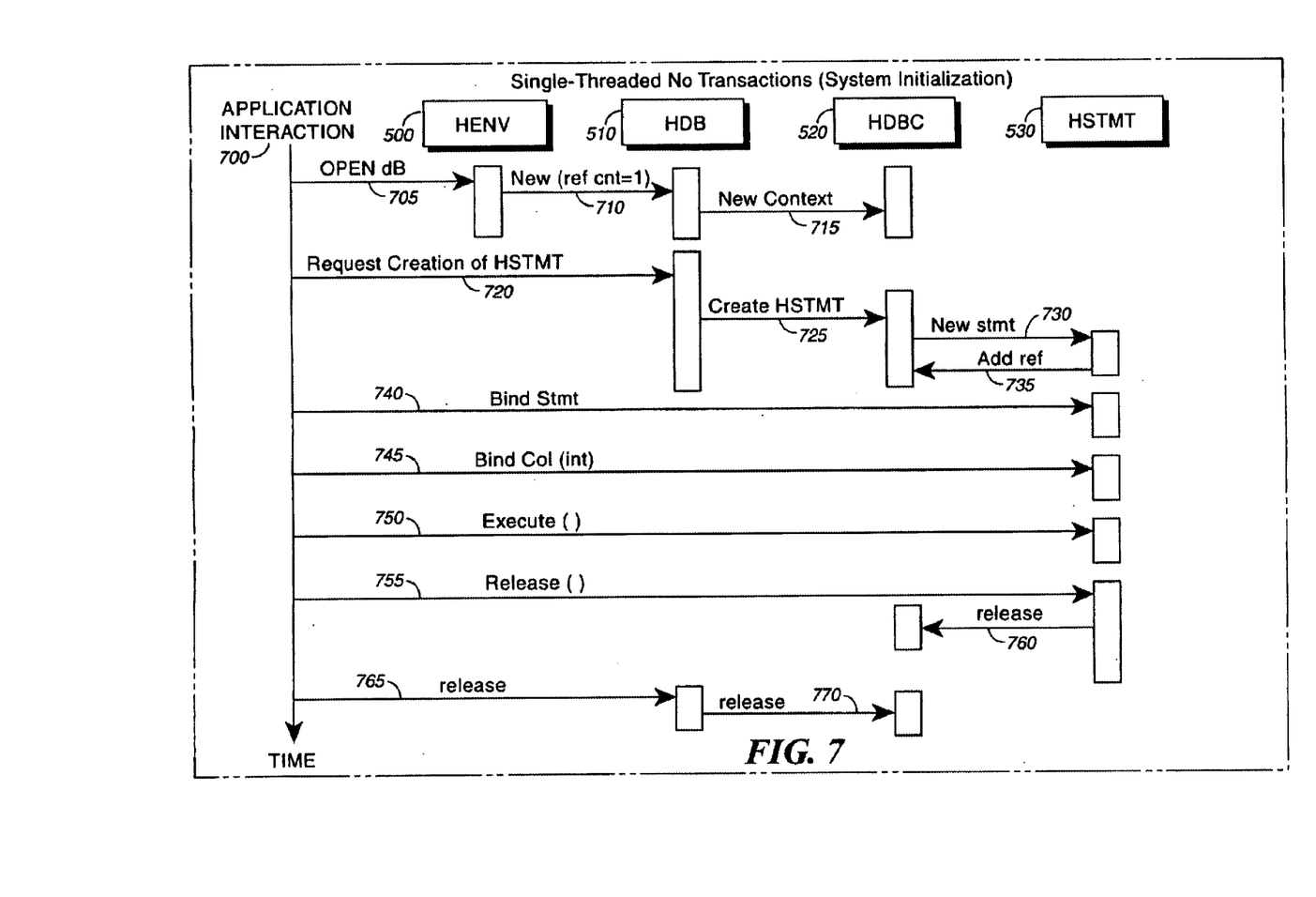
FIG. 7 shows the timeline for using the connection management strategy in a multi-threaded application with no transactions, according to the present invention.

Referring now to FIG. 7, FIG. 8, FIG. 9, and FIG. 10, the order of execution within the connection management layer 310 in a database application that allows chronologically overlapping transactions in a multi-threaded environment, in accordance with the present invention, is shown. Referring now to FIG. 7, a time-line for a single-threaded application 700 with no transactions is shown. The first step in establishing communication between the single-threaded database application 700, and the database 350 is an open database message 705 sent from a task in the application layer and received by an environment object 500. The environment object 500 then sends a new message 710 to a database object 510 requesting a new connection to the database 350 specified in the open database message 705. The database object 510 then sends a new context 715 for the connection to a database connection object 520. The database connection object 520 interacts with objects in the database interface layer 330 to establish the connection with the database 350. The next step in communication between the single-threaded application 700 and the database 350 is the creation of a database query statement. This process starts with a message from the single-threaded application 700 to the database object 510 to request creation of a database statement 720. This request 720 is received by database object 510 and a further message to create a database query statement 725 is sent to the database connection object 520. The database connection object 520 receives this message and sends a message to create a new database query statement 730 to a database query object 530. The database query object 530 creates the query statement and returns an acknowledgement 735 to the database connection object 520.

After the creation of the database query statement 730 described above, the single-threaded application 700 sends messages directly to the database query object 530 to first bind a statement 740, execute the bind column 745, then execute 750 the database query statement, and finally to release 755 the resources associated with the database query statement. After database query object 530 receives the results of the database query from the database interface layer 330, a release message 760 is sent to the database connection object 520. Concurrently, the single-threaded application 700 sends a release message 765 to the database object 510, which in turn sends a release message 770 to the database connection object 520. When the database connection object 520 receives both release messages (770 and 760), the resources allocated for the current database query statement are released.

Note that for the single-threaded application described above, further database query statements utilize the same message process and the same objects. Note further that the messaging process illustrated in FIG. 7 and illustrated above could be applied during a system initialization process for a single-threaded or a multi-threaded application.

Figure 8:
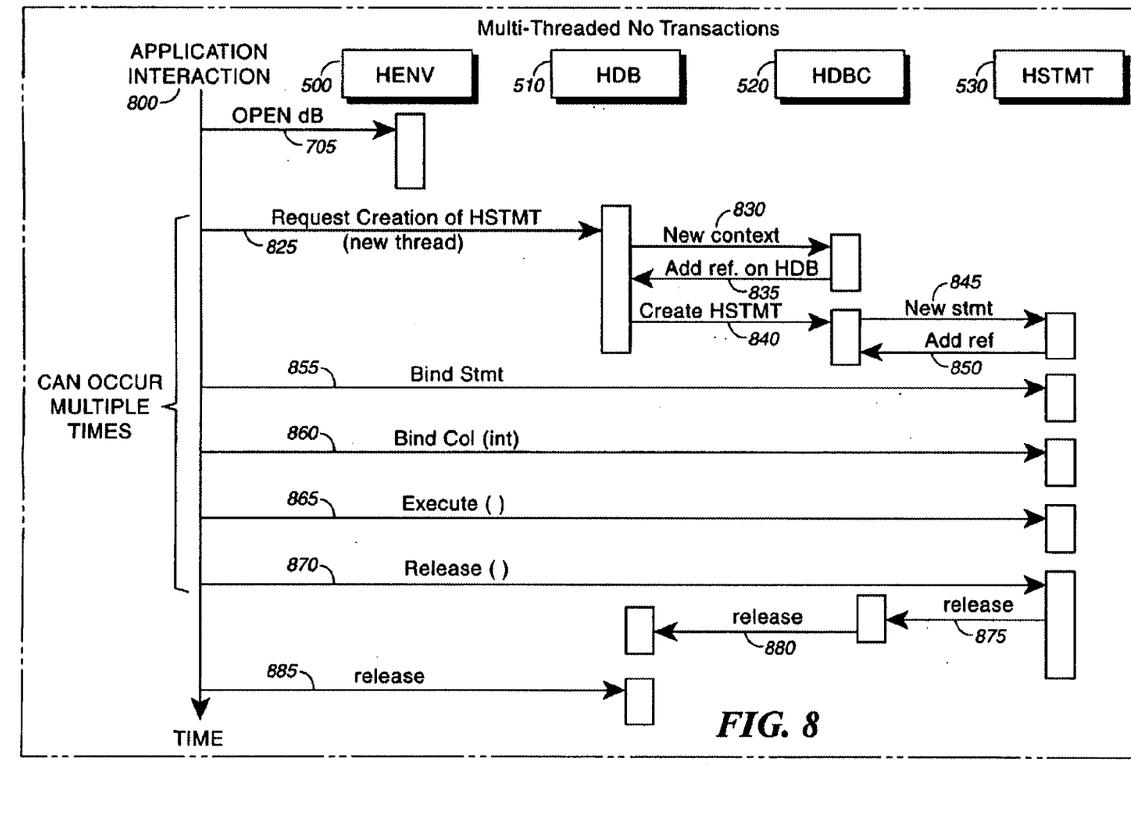
FIG. 8 shows the timeline for using the connection management strategy in a multi-threaded application with transactions, according to the present invention.

Referring now to FIG. 8, a time-line for a multi-threaded database application 800 with no transactions, in accordance with the present invention, is shown. The method illustrated in FIG. 8 assumes that the system initialization process illustrated in FIG. 7 has been completed. Therefore, a connection between multi-threaded application 800 and database 350 already exists after 705 occurs. The first step in establishing communication between multi-threaded database application 800, and database 350 is an open database message 705 that is sent from a task in the application layer and received by environment object 500. Open database message 705 also includes the new ref count 705 and new context 710 actions. The environment object 500 then verifies that the suitable connection exists. The multi-threaded application 800 then sends a message to create a new database query statement 825 to database object 510. The database object 510 then sends a new context 830 for the connection to database connection object 520. The database connection object 520 interacts with objects in database interface layer 330 to ensure the connection with the database 350 and returns a confirmation message 835. Next, database object 510 sends a message to create a database query statement 840 to database connection object 520. The database connection object 520 receives this message and sends a message to create a new database query statement 845 to database query object 530. Database query object 530 creates the query statement and returns an acknowledgement message 850 to database connection object 520. This acknowledgement message 850 could contain a command to increase a reference pointer keeping track of the number of database connection objects 520.

After the creation of the database query statement, the multi-threaded application 590 sends messages directly to database query object 530 to first bind a statement 855, execute the bind column 860, execute 865 the database query statement, and release 870 the resources associated with the database query statement. After database query object 530 receives the results of the database query from database interface layer 330, a release message 875 is sent to database connection object 520. The database connection object 520 then sends a release message 880 to database object 510. Concurrently, multi-threaded application 800 sends a release message 885 to database object 510. When database object 510 receives the release message 885 and the release message 880, the resources allocated for the current database query statement are released. This resource de-allocation could contain a command to decrease the reference pointer keeping track of the number of database connection objects 520. Thus, in this scenario a database connection is created and subsequently deleted for each statement as it is requested.

Note that for a multi-threaded application with no transactions, the method incorporating the creation of the database query statement 825 through the release statement 880 to the database query object 530 may occur multiple times. These steps can use multiple database connection objects 520 to enable the transfer of database queries between the multi-threaded application 800 and database 350.

Figure 9:
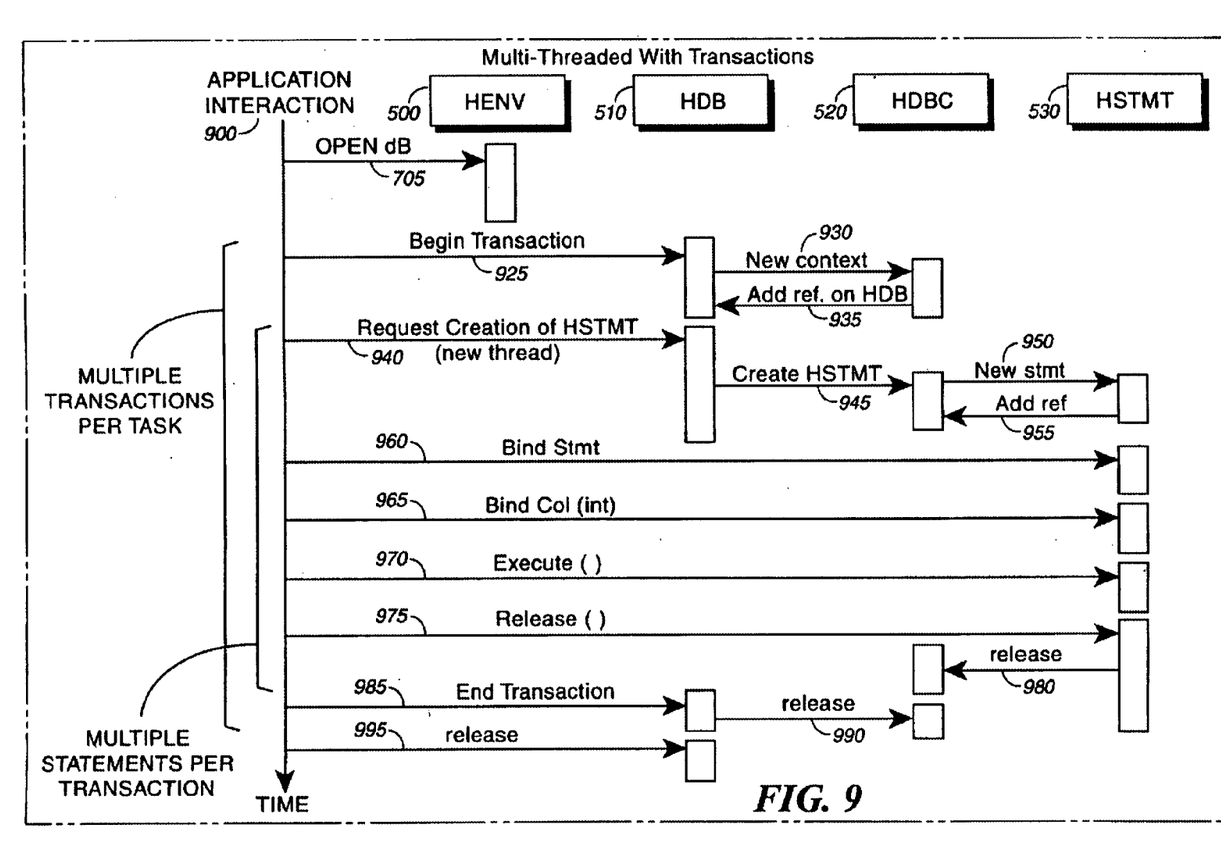
FIG. 9 shows the timeline for using the connection management strategy in a single-threaded application, according to the present invention.
Figure 10:
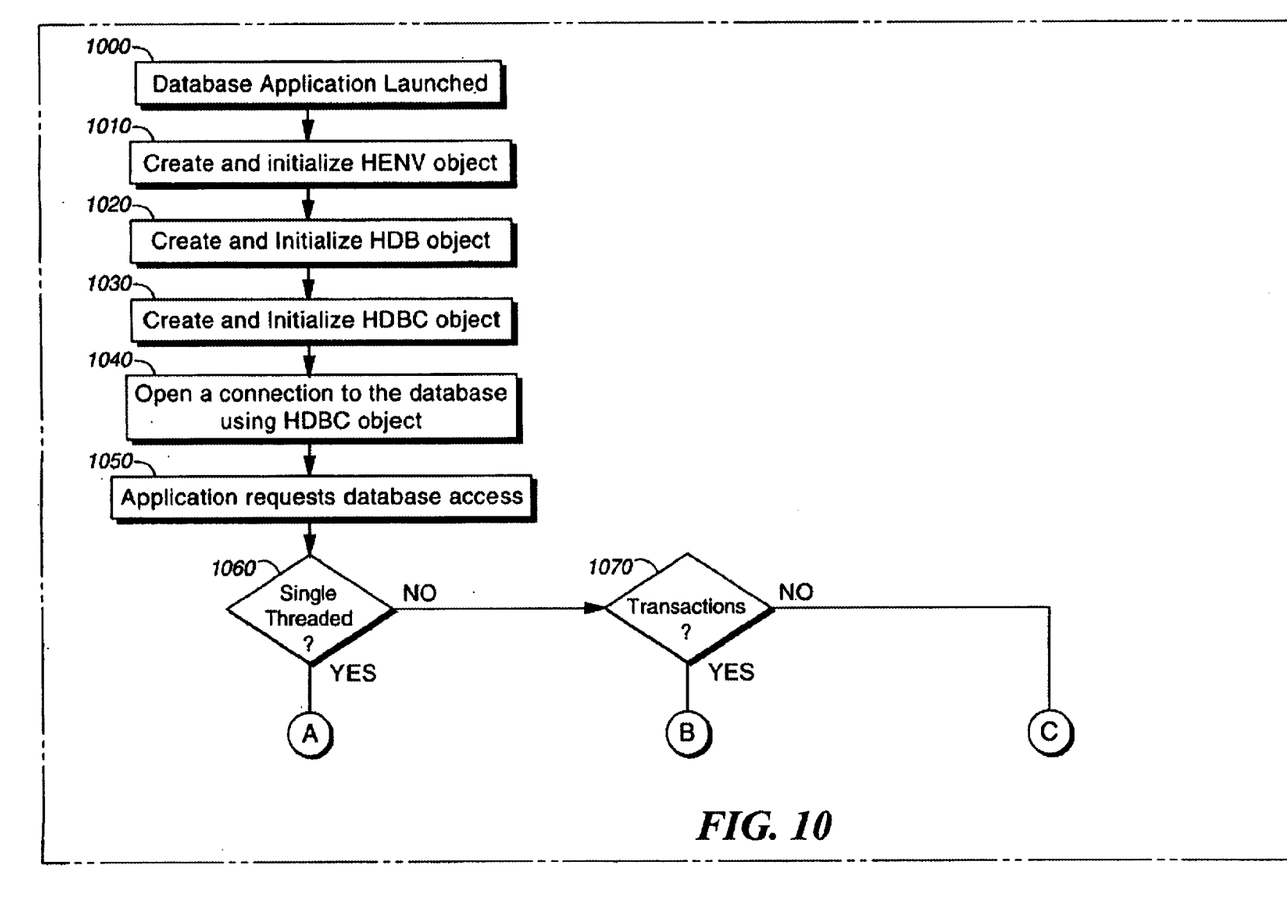
FIG. 10 shows a flowchart representation of how the connection management objects may be created, initialized and used, according to the present invention.

Referring now to FIG. 9, a time-line for a multi-threaded database application 900 with transactions, in accordance with the present invention, is shown. The method illustrated in FIG. 9 assumes that the system initialization process illustrated in FIG. 7 has been completed already. Therefore, a connection between multi-threaded application 900 and database 350 exists after open database message 705 occurs. Establishing communication between the multi-threaded database application 900 and the database 350 begins with open database message 705 which is sent from a task in the application layer and received by environment object 500. Open database message 705 also includes the new ref count 705 and new context 710 actions shown in FIG. 7. The environment object 500 then verifies that the suitable connection exists. The multi-threaded application 900 next sends a message to database object 510 to begin database transaction 925. The database object 510 sends a message 930 to database connection object 520 to select a communication path to the database. The database connection object 520 interacts with objects in database interface layer 330 to ensure the connection with database 350 and returns a confirmation message 935. The multi-threaded application 900 then sends a message to create a new database query statement 940 to database object 510. Next, database object 510 sends a message to create a database query statement 945 to database connection object 520. The database connection object 520 receives this message and sends a message to create a new database query statement 950 to database query object 530. The database query object 530 creates the query statement and returns an acknowledgement message 955 to the database connection object 520. This acknowledgement message 955 could contain a command to increase the reference pointer keeping track of the number of database connection objects 520.

After the creation of the database query statement, multi-threaded application 790 sends messages directly to database query object 530 to first bind a statement 960, execute the bind column 965, execute 970 the database query statement, and release 975 the resources associated with the database query statement. After the database query object 530 receives the results of the database query from the database interface layer 330, a release message 980 is sent to the database connection object 520. Concurrently, the multithreaded application 900 sends a end transaction message 985 to the database object 510. When the database object 510 receives the release message 980 and the release message 975, the resources allocated for the current database query statement are released and a release message 990 is sent to database connection object 520. A final release message 995 from multi-threaded application 900 is then sent to database object 510. The database object 510 then releases the resources associated with the current transaction. This resource de-allocation could contain a command to decrease the reference pointer keeping track of the number of database connection objects 520.

Note that for a multi-threaded application with transactions, the method incorporating the creation of the database query statement 940 through the release statement 980 from the database query object 530 to the database connection object 520 may occur multiple times. This method uses database connection objects 520 to enable the transfer of database queries between the multi-threaded application and the database. Further, the method from the begin transaction message 925 to the end transaction message 990 can be repeated multiple times per each of a plethora of tasks.

One skilled in the art will recognize that any database system may be substituted for the database interface layer without departing from the spirit and scope of the invention. Also, one skilled in the art will recognize that the functionality of FIG. 10 need not be implemented using an object-oriented approach, so long as the methodology incorporated herein is employed.

While the invention has been particularly shown and described with reference to a preferred embodiment, it will be understood by those skilled in the art that various changes in form and detail may be made therein without departing from the spirit and scope of the invention. For example, one of ordinary skill in the art will recognize that Oracle™, ODBC™, or a similar database may be substituted for the database interface layer, without departing from the spirit and scope of the invention.

What is claimed is:

1. A method, comprising:

encapsulating one or more interactions between a database application and a database to allow for one or more chronologically overlapping transactions using a single database connection in a threaded environment, further comprising:

launching the database application;

creating and initializing one or more entities for communicating information between the database application and the database;

opening one or more logical connections to the database;

the database application requesting database access;

using the one or more created and initialized entities for creating, sending and receiving one or more database queries between the database application and the database;

a specialized entity of the one or more created and initialized entities employing a mapping of one or more database application threads to one or more literal connections to the database, wherein the number M of the one or more literal connections to the database can be less than the number N of the one or more threads in the database application; and using the one or more created and initialized entities concurrently so that one or more database transactions may be transmitted in a chronologically overlapping fashion between the database application and the database.

2. The method of claim 1, wherein the one or more literal connections to the database are be pooled.

3. The method of claim 1, further comprising:
one or more environment objects;
one or more database objects;
one or more database connection objects; and
one or more database query objects.

4. The method of claim 3, wherein each of the one or more literal connections to the database are established using the one or more database connection objects.

5. The method of claim 3, wherein the one or more database connection objects are be used as proxies to the one or more literal connections to the database, said one or more database connection objects coupled to said one or more literal connections to the database in a one-to-one correspondence.

6. The method of claim 5, wherein one of the one or more database objects is responsible for the selection and establishment of one database connection object of the one or more database connection objects to couple to a literal connection of the one or more literal connections to the database, said database object assigning a task contained in a thread to the database connection object.

7. The method of claim 3, wherein for a multiple-threaded application, each new database access creates a new database connection object.

8. The method of claim 3, wherein each of the one or more environment objects further comprises:
opening a database;
committing all transactions;
rolling back all transactions;
exiting a callback; and
creating an instance of a database object of the one or more database objects.

9. The method of claim 3, wherein each database object of the one or more database objects further comprises:
opening a connection to the database;
beginning a transaction;
rolling back a transaction;
committing a transaction; and
creating one database query object of the one or more database query objects.

10. The method of claim 3, wherein each created and initialized database connection object of the one or more created and initialized database connection objects further comprises:
accessing an environment object;
accessing a database object;
accessing a database connection object;
beginning a transaction using a current connection;
rolling back a transaction using the current connection; and
committing a transaction using the current connection.

11. The method of claim 3, wherein each database query object of the one or more database query objects further comprises:

accessing one environment object of the one or more environment objects;
accessing one database query object of the one or more database query objects;
binding a database query statement; and
binding one or more parameters in a database query statement.

12. The method of claim 3, wherein the database application is a single-threaded database application and the method further comprises:
the one or more database connection objects consisting of a single default database connection object;
creating and initializing one of the one or more database query objects;
using the one database query object to exchange information with the database; and
using the default database connection object for further database queries.

13. The method of claim 3, wherein the database application is a multi-threaded database application with no transactions and the method further comprises:
initializing a counter for the connection to the database;
creating and initializing one of the one or more of the database query objects;
incrementing the counter for the database connection;
using the one database query object to exchange information with the database;
deleting the one database query object when the exchange of information with the database is complete;
deleting the one database connection object when the exchange of information with the database is complete; and
using a new database connection object of the one or more database connection objects for further database queries.

14. The method of claim 3, wherein the database application is a multi-threaded database application with transactions and the method further comprises:
initializing a counter for the connection to the database;
beginning a transaction with the database;
incrementing the counter for the database connection;
creating and initializing one of the one or more database query objects;
using the one created and initialized database query object to exchange information with the database;
deleting the one database query object when the exchange of information with the database is complete;
ending the transaction with the database;
deleting the one database connection object when the exchange of information with the database is complete; and
using a new database connection object of the one or more database connection objects for one or more additional database queries.

15. The method of claim 3, wherein the method of operation for a single-threaded application further comprises:
the application sending a request to open the database;
an environment object of the one or more environment objects receiving the request and creating a new database object of the one or more database objects;
the created database object creating a database connection object of the one or more database connection objects;

the application sending a request for a database query;

the created database object receiving this request and sending a create query object request to the database connection object;

the database connection object creating a new database query object of the one or more database query objects;

the database query object receiving the database query statement and parameters and assembling the database query statement;

the database query object executing the database query statement after receiving a message from the database application;

upon receiving a release message from the database application, the database query object sending a release statement to the database connection object;

the database application sending a message to the database object, the database object sending a message to the database connection object; and upon receipt of this second release message, the database connection object releasing resources associated with the current database query.

16. The method of claim 3, wherein the method of operation for a multi-threaded application having no transactions comprises:

a. the application sending a request to open the database;

b. the application sending a request to create a new database query statement of one or more database query statements;

c. a database object of the one or more database objects receiving this request and creating a new database connection object of the one or more database connection objects;

d. the database object then sending a message to the database connection object to create the new database query statement of one or more database query statements;

e. the database connection object sending a message to the database query object of the one or more database query objects to create the database query statement;

f. the application then sending a message, receivable by the database query object, binding and executing the database query statement;

g. the application sending a release message;

h. upon receiving a release message from the database application, the database query object sending a release message to the database connection object;

i. the database connection object, upon receiving the release message from the database query object, sending a release message to the database object;

j. the application then sending a release message to the database object, which enables the release of resources associated with the current database query; and k. the application performing steps b through h for each of the one or more database query statements.

17. The method of claim 3, wherein the method of operation for a multi-threaded application using transactions comprises:

a. the application sending a request to open the database;

b. the application sending a begin transaction message to a database object of the one or more database objects;

c. the database object receiving this request and creating a new database connection object of the one or more database connection objects;

d. the application sending a request to create a new database query statement of one or more database query statements;

e. the database object receiving this message and then sending a message to the database connection object, creating the new database query statement of the one or more database query statements;

f. the database connection object sending a message to the database query object to create the database query statement;

g. the application then sending a message, receivable by the database query object, binding and executing the database query statement;

h. the application sending a release message;

i. upon receiving a release message from the database application, the database query object sending a release statement to the database connection object;

j. the application sending an end transaction message, which is received by the database object;

k. the database object, upon receiving the end transaction message, sending a release message to the database connection object;

l. the application then sending a release message to the database object, enabling the release of resources associated with the current database query;

m. the application performing steps b through i one or more times for each of one or more application tasks; and n. the application performing steps d through h one or more times for each transaction of one or more transactions.

18. A structure, comprising:

one or more interactions encapsulated between a database application and a database to allow for chronologically overlapping transactions using a single database connection in a threaded environment, further comprising:

a connection management layer residing below an application layer and above a database interface layer, said database interface layer coupled to the database;

one or more threads K connecting the application layer to the connection management layer;

one or more tasks N contained in the one or more threads K;

one or more connections M between the connection management layer and the database interface layer; and one or more literal connections K between the database interface layer and the database so that one or more database transactions may be transmitted in a chronologically overlapping fashion between the database application and the database.

19. The structure of claim 18, wherein the database connection layer further comprises:

one or more environment entities;

one or more database entities;

one or more database connection entities; and one or more database query entities.

20. The structure of claim 18, wherein the number of one or more tasks N is greater than or equal to the number of one or more connections M between the connection management layer and the database interface layer.

21. The structure of claim 18, wherein the number of one or more connections M between the connection management layer and the database interface layer is the same as the number of one or more connections between the database interface layer and the database.

* * * * *